United States Patent
Goodarzi et al.

(10) Patent No.: US 11,577,782 B2
(45) Date of Patent: Feb. 14, 2023

(54) METHOD AND APPARATUS FOR AN AUTOMATED TRAILER BACKUP SYSTEM IN A MOTOR VEHICLE

(71) Applicant: GM GLOBAL TECHNOLOGY OPERATIONS LLC, Detroit, MI (US)

(72) Inventors: Avesta Goodarzi, Whitby (CA); Steffen P Lindenthal, Oshawa (CA); Akram M. Abdel-Rahman, Ajax (CA); Utkarsh Saini, Claremont (CA); Jomo Hanley, Bowmanville (CA); Norman J. Weigert, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 395 days.

(21) Appl. No.: 16/813,814

(22) Filed: Mar. 10, 2020

(65) Prior Publication Data
US 2021/0284240 A1    Sep. 16, 2021

(51) Int. Cl.
*B62D 15/02* (2006.01)
*B62D 13/06* (2006.01)
(Continued)

(52) U.S. Cl.
CPC ....... *B62D 15/0285* (2013.01); *B62D 13/005* (2013.01); *B62D 13/06* (2013.01);
(Continued)

(58) Field of Classification Search
CPC .. B62D 15/0285; B62D 13/005; B62D 13/06; G06F 3/04847; B60R 1/003;
(Continued)

(56) References Cited

U.S. PATENT DOCUMENTS

| 2003/0156045 A1 * | 8/2003 | Tanaka | B60Q 9/004 348/148 |
| 2008/0211779 A1 * | 9/2008 | Pryor | G06F 3/0488 345/173 |

(Continued)

FOREIGN PATENT DOCUMENTS

| DE | 102009012253 A1 * | 9/2010 | ............ B62D 13/06 |
| DE | 102014005681 A1 * | 10/2015 | ............ B60D 1/245 |

(Continued)

*Primary Examiner* — Dale W Hilgendorf
(74) *Attorney, Agent, or Firm* — Lorenz & Kopf LLP

(57) ABSTRACT

Methods and apparatus are provided for performing an assisted driving trailer reversing operation including a camera operative to capture an image, an interactive user interface operative to display a graphical user interface and to receive a user input, a processor operative to generate the graphical user interface in response to the user input, the user input being indicative of a trailer destination, to generate a left maneuverability margin and a right maneuverability margin in response to a trailer dimension and a hitch angle, and a projected trailer path in response to the trailer destination, wherein the graphical user interface includes the image and a plurality of graphics overlaid on the image indicative of the left maneuverability margin, the right maneuverability margin, the projected trailer path and the trailer destination, and a vehicle controller operative to perform a trailer reversing operation in response to the control signal.

20 Claims, 6 Drawing Sheets

(51) Int. Cl.
*B62D 13/00* (2006.01)
*G06F 3/04847* (2022.01)
*B60R 1/00* (2022.01)
*G06T 11/00* (2006.01)
*H04N 7/18* (2006.01)

(52) U.S. Cl.
CPC .......... *G06F 3/04847* (2013.01); *B60R 1/003* (2013.01); *B60R 2300/20* (2013.01); *B60R 2300/806* (2013.01); *G06T 11/00* (2013.01); *H04N 7/185* (2013.01)

(58) Field of Classification Search
CPC .......... B60R 2300/20; B60R 2300/806; G06T 11/00; H04N 7/185

See application file for complete search history.

(56) References Cited

U.S. PATENT DOCUMENTS

| | | | |
|---|---|---|---|
| 2014/0277941 A1* | 9/2014 | Chiu | B62D 13/06 701/41 |
| 2016/0059888 A1* | 3/2016 | Bradley | B62D 15/027 701/41 |
| 2016/0096549 A1* | 4/2016 | Herzog | B62D 13/06 701/41 |
| 2019/0061816 A1* | 2/2019 | Stabel | B62D 6/003 |
| 2019/0064831 A1* | 2/2019 | Gali | G05D 1/0214 |
| 2020/0001855 A1* | 1/2020 | Watanabe | B62D 13/06 |
| 2020/0017143 A1* | 1/2020 | Gali | B60R 11/04 |
| 2021/0206213 A1* | 7/2021 | Matsushita | B60R 11/04 |

FOREIGN PATENT DOCUMENTS

| | | | | |
|---|---|---|---|---|
| DE | 102016224528 A1 * | 6/2018 | ............ | B60W 50/08 |
| DE | 102017209980 A1 * | 12/2018 | ............ | B60D 1/245 |
| DE | 102020129656 A1 * | 5/2021 | ............ | B62D 15/025 |
| WO | WO-2017096122 A1 * | 6/2017 | ............ | B60D 1/245 |

* cited by examiner

METHOD AND APPARATUS FOR AN AUTOMATED TRAILER BACKUP SYSTEM IN A MOTOR VEHICLE

INTRODUCTION

The present disclosure relates generally to a system of providing an automated trailer backup system in a motor vehicle. More specifically, aspects of the present disclosure relate to systems, methods and devices for providing a user interface having an augmented rear trailer view with an active guidance layer and vehicle control inputs in a trailering application with a motor vehicle.

Pulling a trailer with a tow vehicle has always been and remains a complicated endeavor for many drivers and automated driving systems. A ball hitch is typically employed as a trailer connection and provides a joint between the tow vehicle and the trailer. Aiming the trailer involves turning the rear of the tow vehicle in the opposite direction of the desired direction of the trailer. The geometry of reversing a trailer and having the trailer finish in the desired location can be a daunting task for many drivers. In addition, driver sight lines are often obstructed by the trailer, thereby requiring a second person external to the vehicle to obtain visual confirmation and provide feedback for the driver during a reversing operation. Furthermore, currently employed systems require additional hardware, such as rotational knobs, and add cost and visual complexity to the vehicle. It would be desirable to provide improved trailer control for a vehicle operator during reverse trailering operations while overcoming the aforementioned problems.

The above information disclosed in this background section is only for enhancement of understanding of the background of the invention and therefore it may contain information that does not form the prior art that is already known in this country to a person of ordinary skill in the art.

SUMMARY

Disclosed herein are vehicle control methods and systems and related control logic for provisioning vehicle systems, methods for making and methods for operating such systems, and motor vehicles equipped with onboard control systems. By way of example, and not limitation, there is presented various embodiments of systems for an automated trailer backup system in a motor vehicle and a method for controlling an automated trailer backup for trailering operations in a motor vehicle are disclosed herein.

In accordance with an aspect of the present invention, an apparatus having a camera operative to capture an image of a trailer field of view, an interactive user interface operative to display a graphical user interface wherein the graphical user interface includes a virtual slider button and to receive a user input in response to a user positioning of the virtual slider button, a processor operative to generate the graphical user interface in response to the user input, the user input being indicative of a trailer destination, the processor being further operative to generate a left maneuverability margin and a right maneuverability margin in response to a trailer dimension and a hitch angle, and a projected trailer path in response to the trailer destination, wherein the graphical user interface includes the image and a plurality of graphics overlaid on the image indicative of the left maneuverability margin, the right maneuverability margin, the projected trailer path and the trailer destination, and a vehicle controller operative to perform a trailer reversing operation in response to the control signal.

In accordance with another aspect of the present invention the virtual slider button is displayed on the graphical user interface and wherein the interactive user interface is a touch sensitive display screen.

In accordance with another aspect of the present invention the projected trailer path is determined in response to the hitch angle, the trailer destination, and a trailer dimension.

In accordance with another aspect of the present invention the vehicle controller is operative to perform the trailer reversing operation in response to a user confirmation indicative of a user confirmation of the trailer destination and projected trailer path.

In accordance with another aspect of the present invention the processor is further operative to generate a request for a user confirmation in response to receiving the user input indicative of trailer destination and wherein an indication of the request for user confirmation is displayed on the interactive user interface.

In accordance with another aspect of the present invention the vehicle controller is further operative to control a trailer along the projected trailer path in response to the control signal.

In accordance with another aspect of the present invention further including a depth sensor for determining a depth information within the trailer field of view and wherein the projected trailer path is determined in response to the depth information.

In accordance with another aspect of the present invention the right maneuverability margin and the left maneuverability margin are generated in response to the hitch angle, a trailer length and a hitch length.

In accordance with another aspect of the present invention, a method including capturing, by a camera, an image wherein the image includes a rear field of view from a trailer, generating, by a processor, a left maneuverability margin and a right maneuverability margin in response to a hitch angle and a trailer dimension, displaying the image, the left maneuverability margin and the right maneuverability margin on a touch sensitive user interface, receiving a user input indicative of a trailer destination between the left maneuverability margin and the right maneuverability margin, generating, by the processor, a projected trailer path in response to the trailer destination, controlling, using the vehicle controller, a trailer reversing operation along the projected trailer path to the trailer destination.

In accordance with another aspect of the present invention operative to display the projected trailer path on the touch sensitive user interface in response to generating the projected trailer path.

In accordance with another aspect of the present invention operative to display a user confirmation request in response to generating the projected trailer path and wherein the trailer reversing operation is initiated in response to an affirmative user response to the user confirmation request.

In accordance with another aspect of the present invention the trailer destination is received in response to a position of a virtual slider bar.

In accordance with another aspect of the present invention operative to generate a default trailer destination and default projected trailer path in response to the left maneuverability margin and the right maneuverability margin.

In accordance with another aspect of the present invention the camera is mounted to the rear of the trailer and the image is received via a trailer interface module.

In accordance with another aspect of the present invention the touch sensitive user interface is a center stack vehicle display within a vehicle cabin.

In accordance with another aspect of the present invention the right maneuverability margin and the left maneuverability margin are generated in response to the hitch angle, a trailer length and a hitch length.

In accordance with another aspect of the present invention, an advanced driver assistance system including a camera for capturing a field of view to the rear of a trailer, a user interface for displaying a graphical user interface and for receiving a user input indicative of a final trailer destination, a processor operative to estimate a left maneuverability margin and a right maneuverability margin in response to a hitch angle, a trailer length, and a hitch length, the processor being further operative to generate a default projected trailer path in response to a default trailer destination and to generate a graphical user interface including the image the left maneuverability margin, the right maneuverability margin, the default trailer destination, and the default projected trailer path, the processor being further operative to generate a final projected trailer path in response to the user input indicative of the final trailer destination, and a vehicle controller configured to perform an assisted driving operation in response to the final projected trailer path.

The advanced driver assistance system of claim 17 further including a lidar for detecting a depth information within the field of view of the trailer and wherein the final projected trailer path is determined in response to the depth information.

In accordance with another aspect of the present invention the user interface is a touch sensitive display mounted within a towing vehicle cabin.

In accordance with another aspect of the present invention the graphical interface further includes a virtual slider bar and wherein the final trailer destination is determined in response to a position of a virtual slider on the virtual slider bar.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
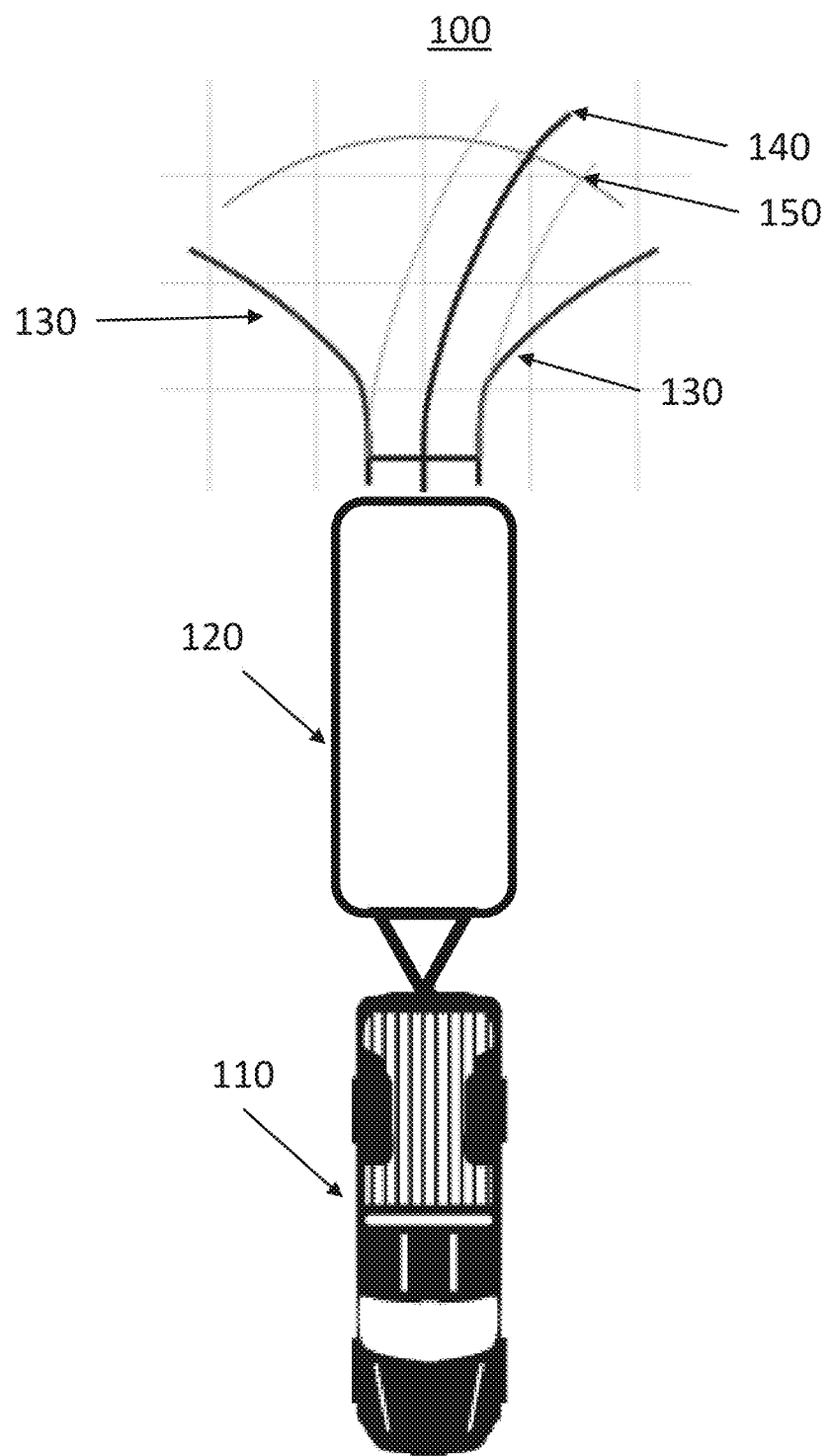
FIG. 1 shows an application for the method and apparatus for an automated trailer backup system in a motor vehicle according to an exemplary embodiment of the present disclosure.

Turning now to FIG. 1, an exemplary environment 100 for the method and apparatus for an automated trailer backup system in a motor vehicle is shown. The exemplary environment 100 shows a towing vehicle 110 equipped with the exemplary system and a trailer 120. The exemplary environment 100 is also illustrative of pair of maneuverability margins indicating a range of possible paths for the trailer 120, a target line 140, indicative of a current desired navigation centerline and destination for the trailer 120, and a projected path 150 indicative of the path to be navigated by the trailer 120 considering the physical dimensions of the trailer 120.

It is desirable to provide a system for helping drivers reverse a trailer with a towing vehicle. Even experienced trailer operators may sometimes have difficulty judging dimensions and the geometry of a trailer reversing operation and may have to repeat the operation several times before the trailer ends up in the desired location. This operation may also require the help of a second person to provide feedback on the location of a trailer as driver sightlines are often blocked by the trailer. Previous systems proposed to aid in these trailering operations required additional hardware, such as a rotational knob or the like, to allow the driver to "steer" the trailer 120 conventionally, while the vehicle control system compensated for the pivot point of the hitch and hitch assembly. The presently disclosed method and apparatus may be used with any type of hitch and will work with a 5$^{th}$ wheel type of trailer, etc. It would be desirable to provide a system which would allow a driver to indicate a desired trailer destination and to provide a visual feedback to the driver of the resulting projected path 150 of the trailer.

In an exemplary embodiment, the augmented display may illustrate lines which may be displayed as indicating two types of path indicators. The trailer reverse path may be the predicted path 150 of where the trailer will go if the user maintains direction/keeps the finger at the currently slider location. The maneuverability margins 130, or the guidelines on the outskirts of the display may illustrate the "jackknife-free left and right maneuverability margins". Within the area that is enveloped by these "jackknife-free maneuverability margins" backing up the trailer will not lead to jackknife. If the user choses to direct the predicted path outside these margins, the trailer will eventually jackknife. Thus, these lines mark the area in which it is safe to backup.

Figure 2:
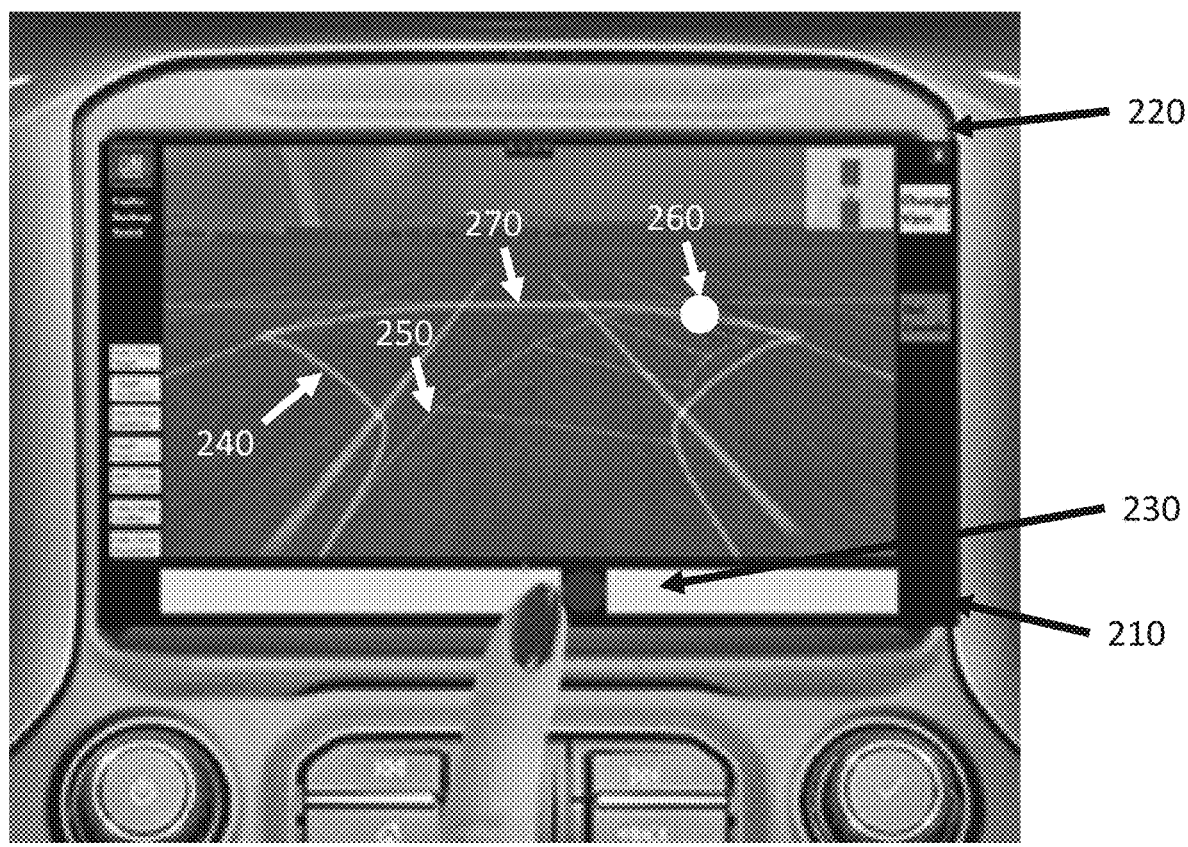
FIG. 2 shows an image of an exemplary user interface for use in an automated trailer backup system in a motor vehicle according to an exemplary embodiment of the present disclosure.

Turning now to FIG. 2, an exemplary environment 200 for the method and apparatus for an automated trailer backup system in a motor vehicle is shown. The exemplary environment 200 shows a user interface 210 displayed on a vehicle center stack screen 220. The exemplary user interface 210 facilitates a driver to select a trailer destination through the center stack screen 220 using a touch control slider 230, while having the trailer rear view, augmented with active guidance indicators indicating the target point 260, maneuverability margins 240, projected trailer path 250, and sensor detection range 270. Using the exemplary user interface 210, the driver may use the touch control sider 230 to establish a location of the target point 260 within the maneuverability margins 240. While adjusting the target point 260 using the touch control sider 230, the projected trailer path 250 is updated indicating to the driver the navigation route to be travelled by the trailer on the way to target point 260 such that potential obstacles may be predicted by the driver while establishing the target point 260. In another exemplary embodiment, the touch interface may further be used to increase the distance of the target point 260 from the rear of the trailer. In response the field of view of the image within the user interface 210 and projected trailer path 250 would be adjusted accordingly.

When using the exemplary user interface 220, maneuverability margins 240, the target point 260 and projected path 250 are displayed to the driver while the driver is determining the target point 260. An advanced driving assistance system (ADAS) may then automatically steer the vehicle to the selected target point 260. The exemplary system advantageously eliminates the difficulty encountered with the manual backing up of a trailer and eliminates the need for an additional physical control for the back up assist system.

In one exemplary embodiment, the system for automation of reversing operations in a trailering mode utilizing the center stack display with a convenient and human machine interface utilize an image captured by a trailer backup camera which is displayed as part of the user interface 220 on the vehicle center stack screen 210. A vehicle operator is then operative to indicate a target point 260 on a defined radius in the user interface by using a slider bar 230. The vehicle operation benefits from an augmented display of the rear-view including guidance lines such as maneuverability margins 240 and a projected trailer path 250. In another exemplary embodiment, the slider bar 230 may be replaced with a knob, or any other applicable type of touch screen controller, button, or user entry interface.

In an exemplary embodiment, the ADAS may perform various algorithms in response to a vehicle operator target point selection, such as hitch angle estimation, destination point coordinates estimation, steering control, projected path calculation, and maneuverability margins calculation.

Figure 3:
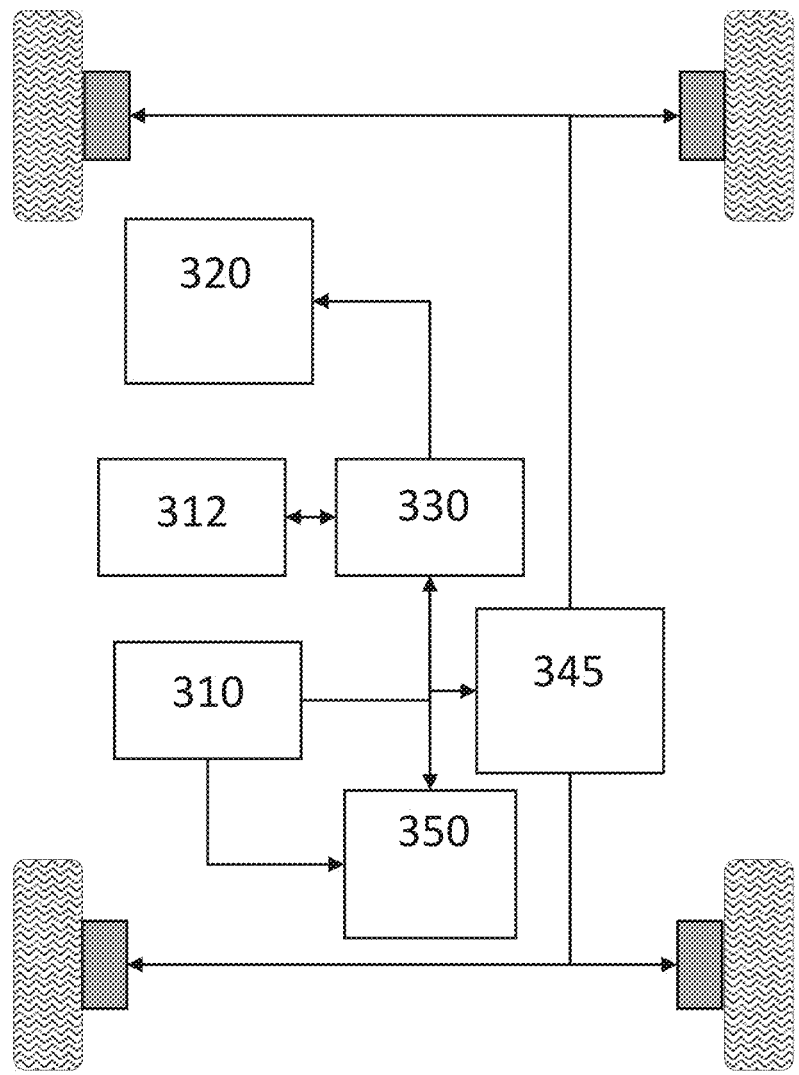
FIG. 3 shows a block diagram of an exemplary system for automated trailer backup system in a motor vehicle according to an exemplary embodiment of the present disclosure.

Turning now to FIG. 3, a block diagram of an exemplary system 300 for automated trailer backup system in a motor vehicle is shown. The system 300 may include a processor 330, a vehicle controller 345, a user interface module 320, trailer interface 350, a lidar 312, and a camera 310.

In an exemplary embodiment the camera 310 may be mounted to the rear of a trailer and the captured images may be coupled to the processor via a trailer interface module 350. Alternatively, the camera 310 may be one or more of a plurality of cameras mounted to the towing vehicle operative to capture images of an individual camera field of view (FOV). The individual of the individual FOVs may be combined to generate a composite FOV displaying an are a rear-view camera mounted to the rear of the vehicle such that the trailer hitch assembly is visible within the image captured by the camera. Alternatively, or in addition, the camera 310 could be one of a plurality of cameras mounted at separate locations around the vehicle and then aligned together in a panoramic or top down view. The camera 310 may transmit an image or series of images to the processor 330 or to a video controller for processing the images and coupling this signal to the processor 330. In an additional exemplary embodiment, the images may be augmented with data from a lidar 312 or radar to provide depth information and information on obscured or partially obscured areas of the image or areas low light or over saturated areas of the image. The exemplary system may further include a lidar 312 operative to capture depth information to objects and surfaces within the camera FOV. The lidar 312 may be mounted on the rear of the trailer or may be integral to the towing vehicle. In another alternative embodiment, other depth sensing or imaging technology such as Lidar, a set of stereo cameras, or high resolution ultrasound could also be used.

The user interface 320 may include a touch screen display operative to display an augmented user interface including the rear trailer view image and to receive a user input on a displayed user input device, such as a touch screen slider bar. The user interface 350 may be operative to receive a user input indicating request to initiate a trailering mode or to initiate a method related to the For example, a vehicle operator may initiate a trailer operation mode for a towing vehicle using the user interface module 350.

The processor 330 may be an ADAS processor and may perform various algorithms in response to a vehicle operator target point selection, such as hitch angle estimation, destination point coordinates estimation, steering control, projected path calculation, and maneuverability margins calculation. In response to the vehicle operator target point selection the processor may be operative to generate a graphical user interface to display maneuverability margins, default target point, projected vehicle path, and the like, as an augmented display over the image received from the camera. Thus, in response to the graphical user interface, the vehicle operator may recognize the projected trailer path during a reversing operation that projected destination and the maneuverability margins within which the trailer may be positioned.

In an exemplary embodiment, the processor 330 may then be operative to generate a control signal in response to the projected trailer path and to couple these control signals to the vehicle controller 345. The processor may perform an ADAS algorithm or the like to generate the control signals to guide the trailer along the projected trailer path. In an exemplary embodiment, the processor 330 is an ADAS controller and trailering route calculation is performed by an ADAS controller. The ADAS controller may be operative to control the propulsion of the vehicle along a path calculated in response to the target point indicated by a vehicle operator. In another exemplary embodiment, the processor 330 may include the vehicle controller 345 which may communicate directly with a throttle controller, brake controller and/or steering controller directly.

The vehicle controller 345 may be operative to receive control signals from the processor 330 and to control a vehicle in response to the control signals. The control signals may include specific navigational route information, may include the destination location, or may include specific steering control, throttle control and braking control instructions.

Figure 4:
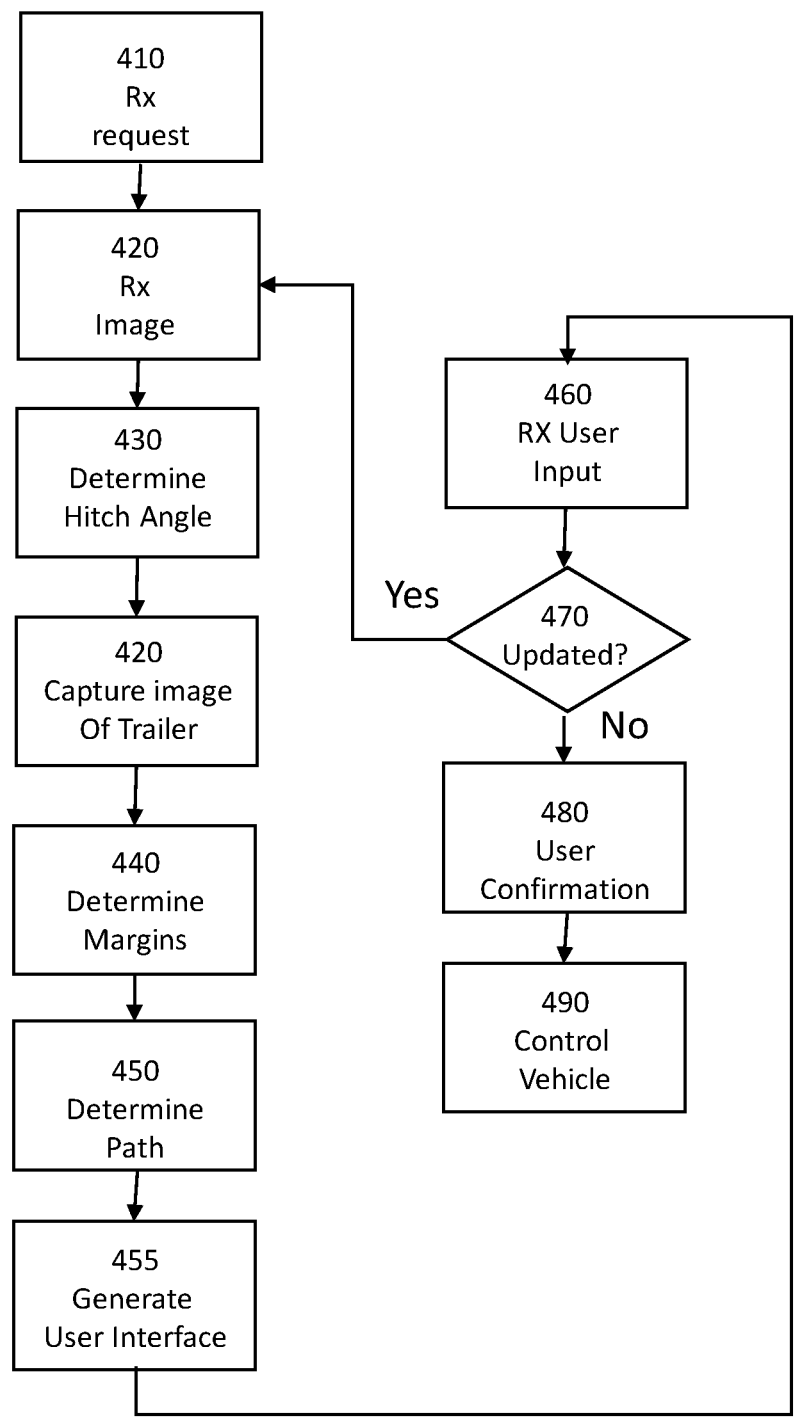
FIG. 4 shows a flow chart illustrating a method for automated trailer backup system in a motor vehicle according to an exemplary embodiment of the present disclosure.

Turning now to FIG. 4, a flow chart illustrating an exemplary method for automated trailer backup system in a motor vehicle 400 according to an exemplary embodiment of the present disclosure is shown. In this exemplary embodiment the method is first operative to receive a request 410 to initiate the automated trailer backup system. This request may be generated in response to a towing vehicle being in a trailering mode and the towing vehicle transmission being shifted to a reversing position. In one exemplary embodiment, the trailering mode may be initiated in response to connection of a trailer to a vehicle trailer hitch or to a trailer interface module. In another exemplary embodiment, the trailering mode may be initiated by a vehicle operator selecting a trailering mode via a vehicle user interface or requesting initiation of the automated trailer backup system and/or user interface.

The method is next operative to receive 420 an image from a rear-view camera or the like having a field of view perspective from the rear of the trailer. The image may be captured by a camera mounted to the rear of the trailer or may be generated in response to a number of images captured by a plurality of cameras each having a different FOV. The number of images may be combined using image processing techniques to generate a composite image of the FOV to the rear of the trailer.

The method is next operative to determine 430 a vehicle hitch angle as an input to a steering control algorithm. The vehicle hitch may be determined in response to an image captured by a camera mounted to the rear of the towing vehicle. The system may be then operative to determine to utilize image processing techniques, such as edge detection, to estimate a hitch angle between a center line of the towing vehicle and the trailer. Alternatively, the hitch angle may be determined in response to kinetic sensors in the towing vehicle the trailer or in the hitch assembly. For example, the hitch angle may be estimated in response to lateral forces applied and detected at the trailer hitch assembly during vehicle movement.

The method is next operative to determine 440 maneuverability margins for the trailer. The maneuverability margins may be determined in response to the maximum hitch angle for the trailer and vehicle combination and over a reversing distance. The maneuverability margins represent the maximum lateral position of the trailering during the reversing operation. In an exemplary embodiment, the vehicle operator may only select a target point within the maneuverability margins. Any target point outside of the maneuverability margins would require the towing vehicle to move forward to move back a starting point of the reversing operation.

The method is next operative to determine 450 a default projected path. In one exemplary embodiment, the default projected path may be established in response to a target point centered between the maneuverability margins at the camera range limit or at a default distance from the rear of the trailer. The default projected path may be an initially determined projection path from which the vehicle operator may adjust the destination point to establish an updated projected path.

The method is next operation to generate 455 a user interface overlay for display on the towing vehicle center stack screen. The user interface may include an augmented image having the maneuverability margins, the default projected path and a default target point overlaid on the captured image. In addition, the user interface may include a touch control slider bar having a virtual slider button. The default position of the virtual slider button will correspond to the position of the default target point. For example, if the default target point is located half way between the maneuverability margins, the default position of the virtual slider button will be in the center of the touch control slider bar.

The method is next operative to receive 460 a user input of a target point indicative of final destination of the trailer. The user input of the target point may be established in response to a user positioning of the virtual slider button on the touch control slider bar. For example, the user may slide the virtual slider button along the touch control slider bar and in response the projected target point will move correspondingly along a path between the maneuverability margins. In one exemplary embodiment, after a duration of time has elapsed the position of the virtual slider button will be used to determine an updated target point in response to the user input. In another exemplary embodiment, the user may adjust the trailer path as the vehicle is moving such that incremental directional changes to the destination are made.

If a user input indicative of an updated target point is received, the method is next operative to determine 470 an updated projected path in response to the updated target point. The method is then operative to update the graphical user interface with the updated projected path. If no user input of an updated target point is received, the method is next operative to receive 480 a user confirmation that the updated target path and the updated target point are the desired final target point and corresponding projected path. The user confirmation may be received in response to a system prompt, a virtual button push, or other affirmative user input.

The method is next operative to control 490 the vehicle in response to projected path and target point. The vehicle may be controlled in response to one or more control signals generated by an ADAS processor performing an assisted driving reversing operation or the like. In one exemplary embodiment the vehicle may stop the reversing operation in response to a brake press by the vehicle operator or other user input indicating a request to stop the reversing operation.

Figure 5:
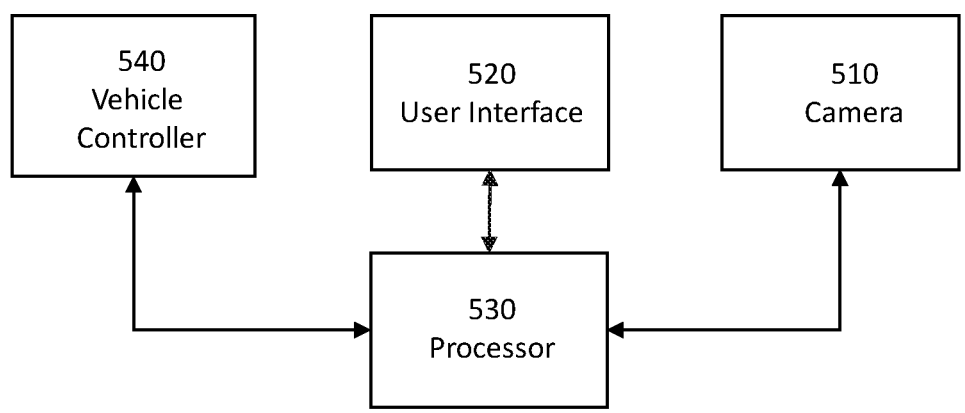
FIG. 5 shows a block diagram illustrating a system for automated trailer backup system in a motor vehicle according to another exemplary embodiment of the present disclosure.

Turning now to FIG. 5, a block diagram illustrating a system 500 for automated trailer backup system in a motor vehicle according to another exemplary embodiment of the present disclosure is shown. The exemplary system includes a camera 510, an interactive user interface 520, a processor 530, and a vehicle controller 540.

In an exemplary embodiment, the camera 510 may be operative to capture an image of a trailer field of view. The camera 510 may be mounted to the rear of a trailer or may be one or more cameras mounted on the towing vehicle wherein their combined FOV may be operative to capture an FOV of an area to the rear of the trailer. In another exemplary embodiment, the camera 510 may include a depth sensor, such as a lidar or a radar, operative for determining a depth information within the trailer FOV. A projected trailer path may be determined in response to the depth information.

The exemplary system may further include a user interface 520, such as an interactive user interface, operative to display a graphical user interface wherein the graphical user interface includes a virtual slider button and to receive a user input in response to a user positioning of the virtual slider button. In one exemplary embodiment, the virtual slider button is displayed on the graphical user interface and wherein the interactive user interface is a touch sensitive display screen. In another exemplary embodiment, the user interface 520 may be a touchpad or other touch sensitive user interface 520. The touchpad may be used in conjunction with a display.

The exemplary system may further include a processor 530 operative to generate the graphical user interface in response to the user input, the user input being indicative of a trailer destination, the processor being further operative to generate a left maneuverability margin and a right maneuverability margin in response to a trailer dimension and a hitch angle, and a projected trailer path in response to the trailer destination, wherein the graphical user interface includes the image and a plurality of graphics overlaid on the image indicative of the left maneuverability margin, the right maneuverability margin, the projected trailer path and the trailer destination. In one exemplary embodiment, the projected trailer path may be determined in response to the hitch angle, the trailer destination, and a trailer dimension. In another exemplary embodiment, the processor 530 is operative to generate a request for a user confirmation in response to receiving the user input indicative of trailer destination and wherein an indication of the request for user confirmation is displayed on the interactive user interface. In another exemplary embodiment, the right maneuverability margin and the left maneuverability margin may be generated in response to the hitch angle, a trailer length and a hitch length.

The exemplary system may further include a vehicle controller 540 operative to perform a trailer reversing operation in response to the control signal. the vehicle controller is operative to perform the trailer reversing operation in response to a user confirmation indicative of a user confirmation of the trailer destination and projected trailer path the vehicle controller is further operative to control a trailer along the projected trailer path in response to the control signal.

In an additional embodiment, the exemplary system 500 may be an advanced driver assistance system including a camera 510 for capturing a field of view to the rear of a trailer, a user interface 520 for displaying a graphical user interface and for receiving a user input indicative of a final trailer destination, a processor 530 operative to estimate a left maneuverability margin and a right maneuverability margin in response to a hitch angle, a trailer length, and a hitch length, the processor being further operative to generate a default projected trailer path in response to a default trailer destination anti generate a graphical user interface including the image the left maneuverability margin comma the right maneuverability margin, the default trailer destination, and the default projected trailer pass, The process are being further operative to generate a final projected trailer path in response to the user input indicative of the final trailer destination and a vehicle controller 540 configured to perform an assisted driving operation in response to the final projected trailer path.

The advanced driver assistance system 500 may further include a depth sensor such as a lidar for detecting a depth information within the field of view of the trailer and wherein the final projected trailer path is determined in response to the depth information. The user interface 520 may be a touch sensitive display mounted within a towing vehicle cabin operative to display the graphical interface including a virtual slider bar and wherein the final trailer destination is determined in response to a position of a virtual slider on the virtual slider bar.

Figure 6:
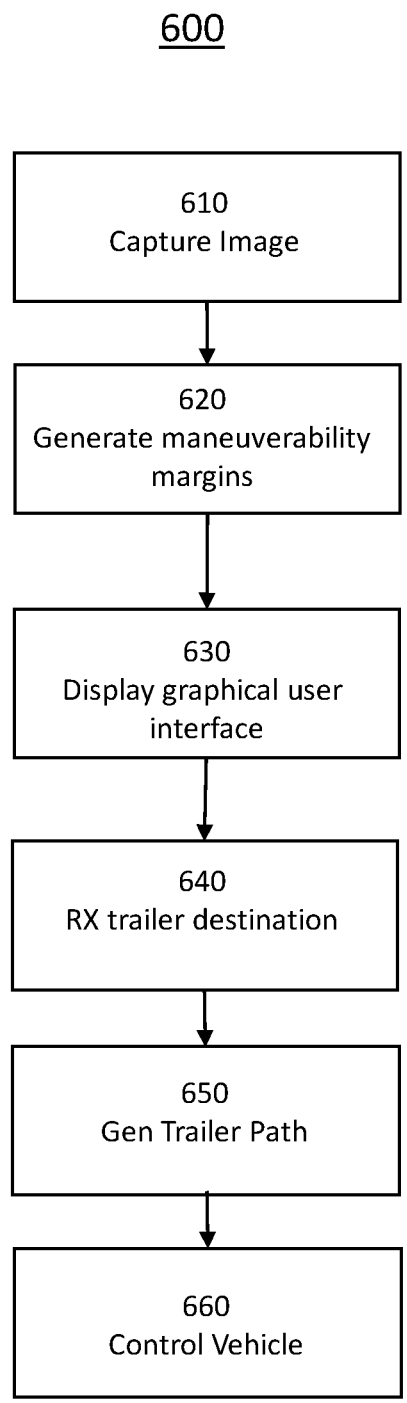
FIG. 6 shows a flow chart illustrating a method for automated trailer backup system in a motor vehicle according to another exemplary embodiment of the present disclosure.

Turning now to FIG. 6, a flow chart illustrating a method 600 for automated trailer backup system in a motor vehicle according to another exemplary embodiment of the present disclosure is shown. The exemplary method 600 is first operative for capturing 610, by a camera, an image wherein the image includes a rear field of view from a trailer. In one exemplary embodiment, the camera may be mounted to the rear of the trailer and the image is received via a trailer interface module.

The method is next operative for generating 620, by a processor, a left maneuverability margin and a right maneuverability margin in response to a hitch angle and a trailer dimension.

The method may then display 630 the image, the left maneuverability margin and the right maneuverability margin on a touch sensitive user interface. In an exemplary embodiment, the method may generate a default trailer destination and default projected trailer path in response to the left maneuverability margin and the right maneuverability margin. In another exemplary embodiment, the right maneuverability margin and the left maneuverability margin may be generated in response to the hitch angle, a trailer length and a hitch length.

The method is next configured for receiving 640 a user input indicative of a trailer destination between the left maneuverability margin and the right maneuverability margin. In one exemplary embodiment, the trailer destination is received in response to a position of a virtual slider bar. In one exemplary embodiment, the touch sensitive user interface may be a center stack vehicle display within a vehicle cabin.

The method is next operative for generating 650, by the processor, a projected trailer path in response to the trailer destination. The method may then display the projected trailer path on the touch sensitive user interface in response to generating the projected trailer path.

The method is then operative for controlling 660, using the vehicle controller, a trailer reversing operation along the projected trailer path to the trailer destination.

In one exemplary embodiment, the method may be further operative to display a user confirmation request, such as a pop up screen, audio prompt, or virtual user input, such as a button displayed on the user interface, in response to generating the projected trailer path and wherein the trailer reversing operation is initiated in response to an affirmative user response to the user confirmation request.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
 a camera operative to capture an image of a trailer field of view;
 an interactive user interface operative to display a graphical user interface wherein the graphical user interface includes a slider button to receive a user input in response to a user positioning of the slider button;
 a processor operative to generate the graphical user interface in response to the user input, the user positioning of the slider button being used to indicate a trailer destination, the processor being further operative to generate a projected trailer path in response to the trailer destination, wherein the graphical user interface includes the image and a plurality of graphics overlaid on the image indicative of the projected trailer path, a left maneuverability margin and a right maneuverability margin, and the trailer destination and wherein the user positioning of the slider button further changes a location of the trailer destination displayed on the image by the graphical user interface; and a vehicle controller operative to perform a trailer reversing operation in response to the projected trailer path.

2. The apparatus of claim 1 wherein the slider button is displayed on the graphical user interface and wherein the interactive user interface is a touch sensitive display screen.

3. The apparatus of claim 1 wherein the projected trailer path is determined in response to a hitch angle, the trailer destination, and a trailer dimension.

4. The apparatus of claim 1 wherein the vehicle controller is operative to perform the trailer reversing operation in response to a user confirmation of the trailer destination and the projected trailer path.

5. The apparatus of claim 1 wherein the left maneuverability margin and the right maneuverability margin are generated in response to a trailer dimension and a hitch angle.

6. The apparatus of claim 5 wherein the right maneuverability margin and the left maneuverability margin are generated in response to the hitch angle, a trailer length and a hitch length.

7. The apparatus of claim 1 wherein the vehicle controller is further operative to control a trailer along the projected trailer path in response to the projected trailer path.

8. The apparatus of claim 1 further including a depth sensor for determining a depth information within the trailer field of view and wherein the projected trailer path is determined in response to the depth information.

9. A method comprising:
capturing, by a camera, an image wherein the image includes a rear field of view from a trailer;
generating, by a processor, a left maneuverability margin and a right maneuverability margin in response to a hitch angle and a trailer dimension;
displaying the image, the left maneuverability margin, the right maneuverability margin and a trailer destination on a touch sensitive user interface including a slider button;
receiving a user input in response to the user positioning the slider button to adjust the trailer destination between the left maneuverability margin and the right maneuverability margin wherein a user positioning of the slider button changes a location of the trailer destination displayed on the image by the touch sensitive user interface;
generating, by the processor, a projected trailer path in response to the trailer destination;
controlling, using a vehicle controller, a trailer reversing operation along the projected trailer path to the trailer destination.

10. The method of claim 9 further operative to display the projected trailer path on the touch sensitive user interface in response to generating the projected trailer path.

11. The method of claim 9 further operative to display a user confirmation request in response to generating the projected trailer path and wherein the trailer reversing operation is initiated in response to an affirmative user response to the user confirmation request.

12. The method of claim 9 wherein the user input is restricted from selecting a trailer destination outside of the left maneuverability margin and the right maneuverability margin.

13. The method of claim 9 further operative to generate a default trailer destination and default projected trailer path in response to the left maneuverability margin and the right maneuverability margin.

14. The method of claim 9 wherein the camera is mounted to the rear of the trailer and the image is received via a trailer interface module.

15. The method of claim 9 wherein the touch sensitive user interface is a center stack vehicle display within a vehicle cabin.

16. The method of claim 9 wherein the right maneuverability margin and the left maneuverability margin are generated in response to the hitch angle, a trailer length and a hitch length.

17. An advanced driver assistance system comprising;
a camera for capturing an image of a field of view to the rear of a trailer;
a user interface for displaying a graphical user interface including a slider button and for receiving a user input in response to a user positioning the slider button to indicate a final trailer destination wherein the user positioning of the slider button changes a location of the final trailer destination displayed on the image by the graphical user interface;
a processor operative to estimate a left maneuverability margin and a right maneuverability margin in response to a hitch angle, a trailer length, and a hitch length, the processor being further operative to generate a default projected trailer path in response to a default trailer destination and to generate the graphical user interface including the image, the left maneuverability margin, the right maneuverability margin, the default trailer destination, and the default projected trailer path, the processor being further operative to generate a final projected trailer path in response to the user input indicative of the final trailer destination; and
a vehicle controller configured to perform an assisted driving operation in response to the final projected trailer path.

18. The advanced driver assistance system of claim 17 further including a lidar for detecting a depth information within the field of view of the trailer and wherein the final projected trailer path is determined in response to the depth information.

19. The advanced driver assistance system of claim 17 wherein the user interface is a touch sensitive display mounted within a towing vehicle cabin.

20. The advanced driver assistance system of claim 17 wherein the graphical user interface further includes a virtual slider bar and wherein the final trailer destination is determined in response to a position of a virtual slider on the virtual slider bar.

* * * * *